| Receiving Points, Lines or Surfaces ||||||
|---|---|---|---|---|
| Reference Numeral | Name of Element | Number of Receiving Points | Length of Receiving Lines or Surfaces | see Fig. |
| 1 | Stud | 4 | – | 6 |
| 2 | Stud | 4 | – | 6 |
| 3P & 3L | Socket or hole | 1 | – | 7 |
| 4 | Stud | 4 | – | 6 |
| 5 | Stud | 4 | – | 6 |
| 6 | Socket with bolt and nut | 2 | – | 8 |
| 7 | Socket with bolt and nut | 2 | – | 8 |
| (7a) | Ledge with row of holes | (11) | – | 8 |
| 8 | Conical Bushing | 2 | – | 9 |
| 9 | Conical Bushing | 2 | – | 9 |
| 10 | Cylindrical Bushing | 2 | – | 10 |
| 11 | Cylindrical Bushing | 2 | – | 10 |
| 11M | Stud with Screwhole | 1 | – | 10 |
| 12 | Cylindrical Bushing | 2 | – | 10 |
| 13 | Cylindrical Bushing | 2 | – | 10 |
| 14 | Eye | 11 | – | 11 |
| 15 | Hole | 3 | – | 12 |
| 16 | Hole | 11 | – | 12 |
| 17 | Edge Reinforcement | – | 2 x 1.30 m | 13 |
| 18 | Hole | 3 | – | 12 |
| 19 | Hole | 8 | – | 12 |
| 20 | Elliptic Ledge | – | 1.20 m | 12 |
| 21 | Hole or | 22 | – | 13 |
| (21a) | Ledge | – | (2 x 1.50 m) | 13 |
| 22 | Eye | 11 | – | 14 |
| 23A | Bore | 2 | – | 15 |
| 23B | Eye | 2 | – | 15 |
| 24A | Bore | 2 | – | 15 |
| 24B | Eye | 2 | – | 15 |
| 25 | Hook | 9 | – | 16,17 |
| 26 | Hook | 9 | – | 16,17 |
| 27 | Eye | 11 | – | 18 |
| 28 | Hole | 1 | – | 19 |
| 29 | Pipe | 2 | – | 20 |
| 30 | Pipe | 2 | – | 20 |
| | | 145 | 3.80 m | |

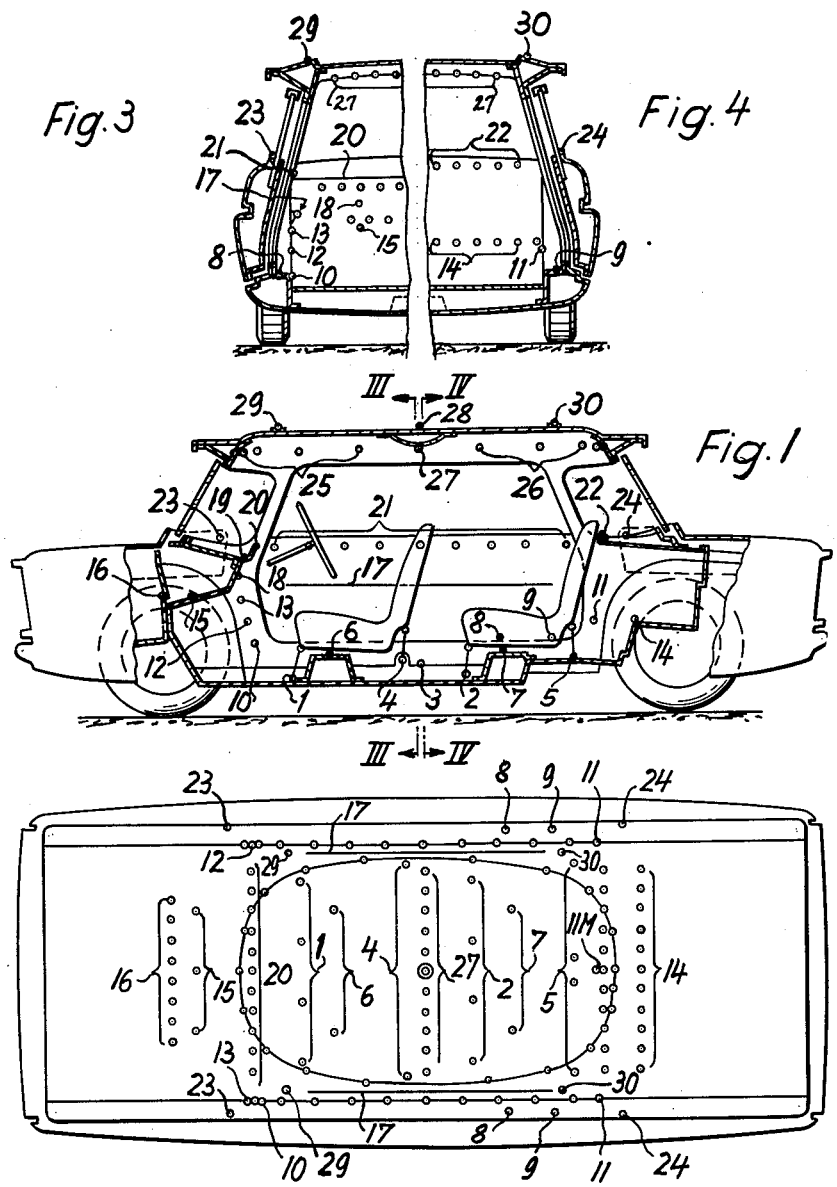

Fig. 5

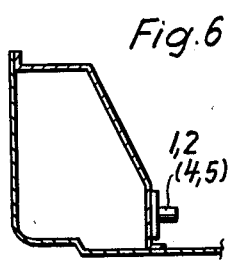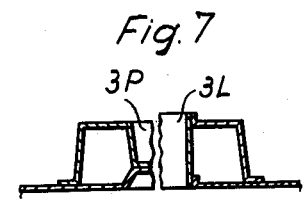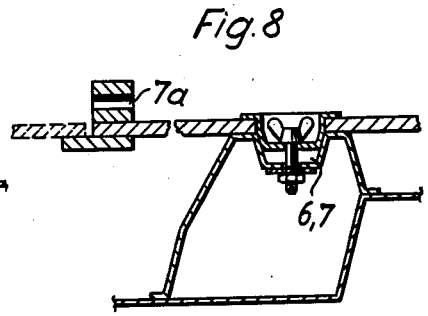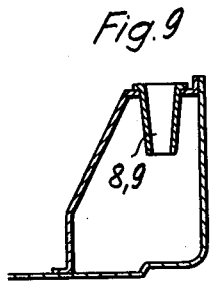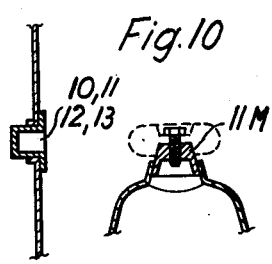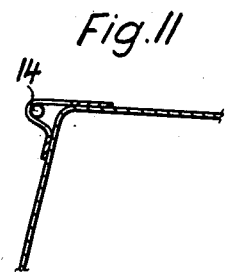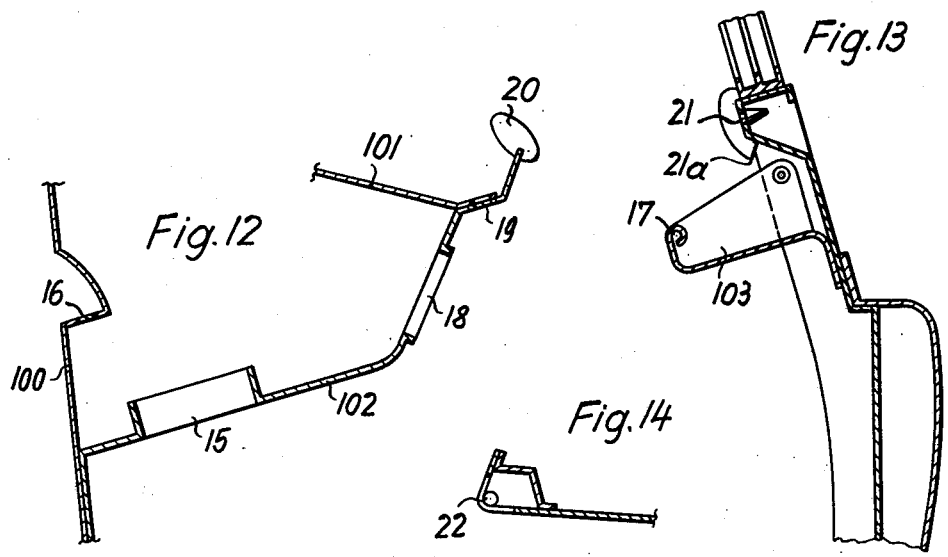

INVENTOR.
BÉLA BARÉNYI
ATTORNEYS

March 5, 1963 B. BARÉNYI 3,080,189
ALL-PURPOSE MOTOR VEHICLE
Filed Jan. 21, 1960 6 Sheets-Sheet 5
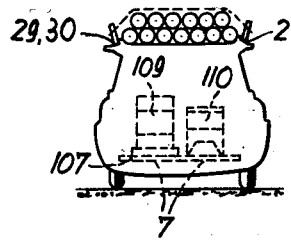
Fig. 23
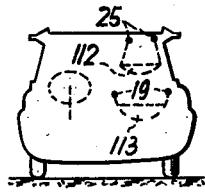
Fig. 26
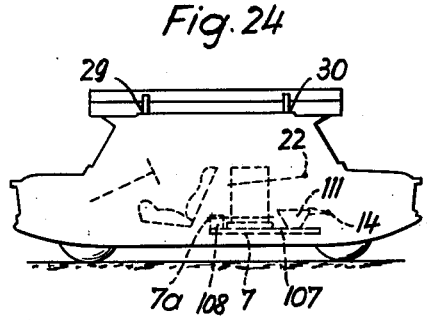
Fig. 24
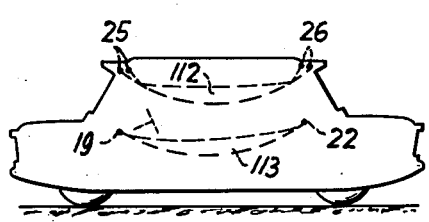
Fig. 27
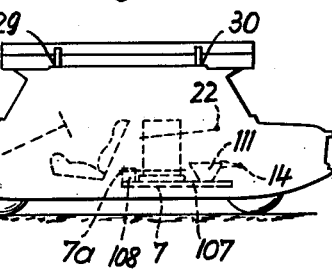
Fig. 25
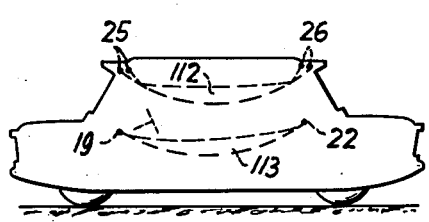
Fig. 28
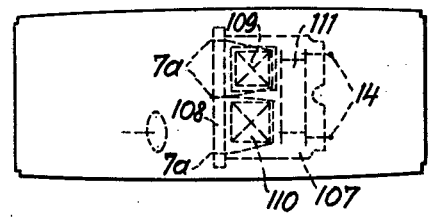
Fig. 30
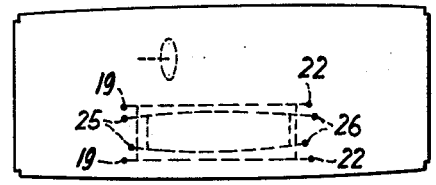
Fig. 29
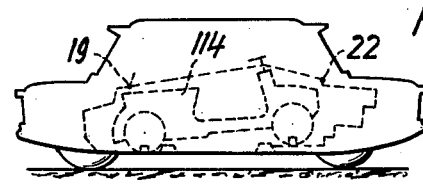
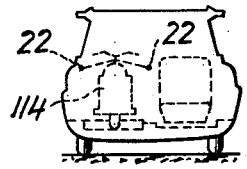
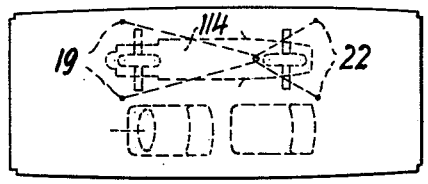
Fig. 31
INVENTOR.
BÉLA BARÉNYI
BY
ATTORNEYS

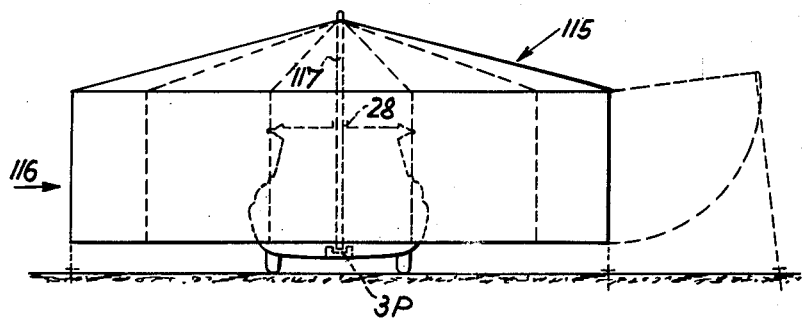
Fig. 32
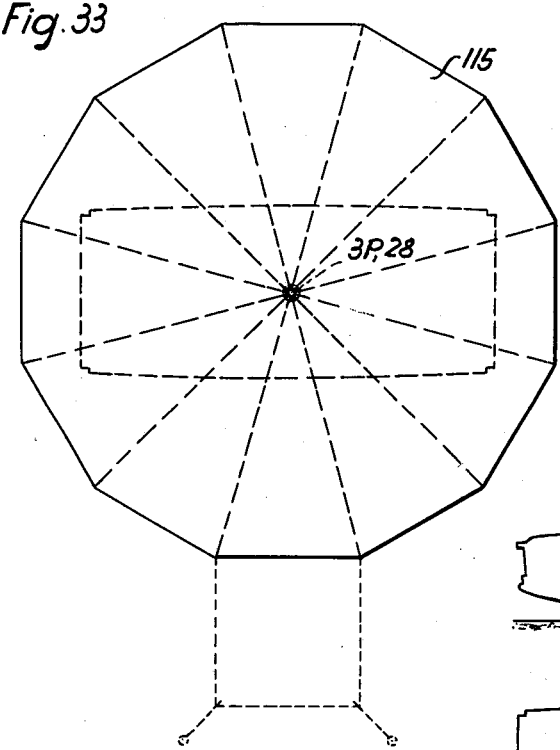
Fig. 33
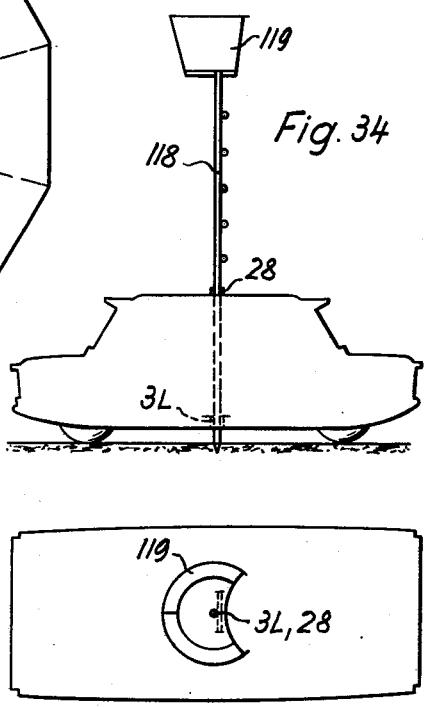
Fig. 34
Fig. 35
INVENTOR.
BÉLA BARÉNYI United States Patent Office 3,080,189
Patented Mar. 5, 1963

3,080,189
ALL-PURPOSE MOTOR VEHICLE
Béla Barényi, Stuttgart-Vaihingen, Germany, assignor to Daimler-Benz Aktiengesellschaft, Stuttgart-Unterturkheim, Germany
Filed Jan. 21, 1960, Ser. No. 3,955
Claims priority, application Germany Jan. 27, 1959
2 Claims. (Cl. 296—28)

The present invention relates to a motor vehicle and more particularly to a passenger car, and it is an object of the present invention to provide a new type of car which may be converted very quickly and without considerable alterations or additional means to be used for many different purposes, and to insure that at any such use of the car the items to be transported thereby or to be used in connection with the car when in a stationary position will be firmly secured on or within the car.

For attaining the above-mentioned object the present invention provides on at least two opposite, and preferably parallel walls of the car, including the top and bottom walls, one or more systems of points, lines or surfaces which individually or in combination with each other may be utilized for attaching, mounting, suspending, depositing, clamping, securing, or erecting the items to be transported in or on the car or to be used in connection with the car in a stationary position.

The invention further provides the opposite surfaces of the inside of a car body, for example, the floor and top, the side walls, the opposite doors which preferably are provided in the form of sliding doors, and the front and rear walls, with a common system of receiving points and/or receiving lines or surfaces, or each of these wall surfaces of the car body with one or more individual systems of such points, lines or surfaces which form a part of a common system.

The individual receiving points, lines, or surfaces may be equipped with any securing means which may be suitable for the particular purpose, such as journals, pivots, studs, sockets, apertures, recesses, threaded bolts and nuts, cylindrical or conical bushings, eyes, bores, hooks, pipe sections, or the like, and the receiving lines or surfaces may also be provided in the form of rows of holes, ledges with or without rows of holes, edge reinforcements, strips or ledges of an arcuate, elliptical or other cross-sectional shape, pipes or the like. The term "receiving points" as used in the appended claims encompasses such journals, studs, sockets etc.

The invention further provides one or more systems of such receiving points, lines or surfaces at different levels of the car body, preferably on and adjacent to the floor or bottom of the car body, within a central level, and on and adjacent to the car top.

The individual receiving points or rows of such points may, if desired, also be covered by self-locking plugs, strips, ledges or the like which are preferably made of plastic.

Still another feature of the invention consists in providing one or more additional systems of receiving points, lines or surfaces which may be removably secured to one or more receiving points or systems of such points which constitute a fixed part of the car body.

These and numerous other objects, features, and advantages of the present invention will become more apparent from the following detailed description thereof, particularly when read with reference to the accompanying drawings, in which:

FIGURES 1 to 4 show diagrammatic outline views of a passenger car to illustrate the arrangement of the receiving points and receiving lines or surfaces according to the invention, in which FIGURE 1 is a central longitudinal section of the car, FIGURE 2 is a bottom view thereof, while FIGURES 3 and 4 are cross sections of opposite halves of the car looking in the directions of lines III—III and IV—IV, respectively of FIGURE 1;

FIGURE 5 shows a list of the receiving points, lines or surfaces and of their location in the car to facilitate the reading of the drawings;

FIGURES 6 to 11 show cross-sectional views of different bottom parts of the car with the receiving points thereof as indicated in FIGURES 1 to 4 and the securing elements provided at these points;

FIGURES 12 to 15 show cross-sectional views of different central parts of the car with the securing elements provided at the receiving points of these parts as indicated in FIGURES 1 to 4;

FIGURES 16 to 20 show cross-sectional views of different top parts of the car with the securing elements provided at the receiving points of these parts as indicated in FIGURES 1 to 4; while FIGURES 21 to 35 show general outline views of six different possibilities of applying the invention on a car as illustrated in FIGURES 1 to 4.

Figure 15:
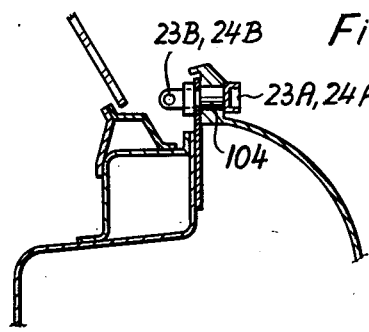

Referring first particularly to FIGURES 1 to 4 of the drawings which show diagrammatic outlines of a passenger car as viewed in different directions, and illustrate the general location and arrangement of the various receiving points, lines or surfaces or systems of such points, lines or surfaces according to the invention. These points are indicated in FIGURES 1 to 4 and in the other drawings by numerals 1 to 30, and they are likewise itemized in the list, shown in FIGURE 5, which also indicates the frequency of their individual occurrence, the length of the receiving lines or surfaces, as well as the particular location of these points, lines and surfaces in the various detail drawings shown in FIGURES 6 to 20, and the title under which they will appear in the subsequent description. This list according to FIGURE 5 serves primarily as a directory to facilitate a reading of the drawings.

The first column of this list indicates the reference numerals of the various receiving points, lines and surfaces as used in this description and the drawings, the second column states the names of the particular receiving points, lines or surfaces, the third column indicates the frequency in which these receiving points and elements occur, the fourth column indicates the length of the receiving lines or surfaces, while the last column indicates the figures of the accompanying drawings in which the individual receiving points, lines or surfaces may be quickly located.

FIGURES 6 to 11 show the elements which represent the receiving points, lines or surfaces in the lower part of the car, as indicated in FIGURES 1 to 4, and particularly on and adjacent to the bottom of the car body.

FIGURE 6 shows a cross section taken in a direction transverse to the longitudinal axis of the car within the area indicated in FIGURES 1 to 4 by points 1, 2, 4, and 5. Although these points do not lie within the same transverse plane, they have been so indicated in FIGURE 6 in the form of a single stud or pivot pin.

FIGURE 7 shows the receiving points 3 P and 3 L in the form of a socket or a bushing, respectively, either of which may preferably be provided in the central longitudinal girder of the car frame and be used, for example, for mounting a central mast.

FIGURE 8 shows the receiving points 6 and 7 in the form of a socket with a bolt and nut for securing floor boards and the like. These points may also be used for securing the seat adjusting device or a table, chair or container. FIGURE 8 further indicates at 7a a row of apertures provided in a ledge which is secured to the floor boards and extends transversely to the longitudinal axis of the car. The individual apertures of this row may be used for attaching and securing various objects to be transported in the car or for securing seats and the like.

FIGURE 9 shows the receiving points 8 and 9 which form conical sockets or bushings for supporting the suspending and sliding elements of a sliding door, not shown. These sockets or bushings may, however, also be used for mounting therein the connecting members of tables, benches and the like.

FIGURE 10 illustrates receiving and securing means for beds or cots to be mounted at the inside of the car. They consist of the receiving points 10, 11, 12, and 13 which are made in the form of cylindrical sockets, and the receiving point 11M in the form of a stud with a threaded hole therein. These receiving points are provided in upright parts of the car body.

FIGURE 11 shows the receiving points 14 in the form of a single long strip of sheet metal which is notched out at regular intervals and carries at the inside thereof a single wire. The parts of this wire which are exposed at the notched-out recesses of the metal mounting strip form eyes which may be utilized, for example, for attaching safety belts, for securing pieces of baggage which are to be stored in a baggage compartment, or for similar purposes.

FIGURES 12 to 15 illustrate preferred embodiments of receiving points which are provided substantially in the central area of the interior of the car body up to the level of the lower edge of the windows.

FIGURE 12 shows the rear end wall 100 of a front engine or baggage compartment, a slightly inclined panel 101 extending from the lower side of the windshield, not shown in FIGURE 12, to a level above the dashboard and commonly used for depositing loose items thereon, and a partition 102 which connects wall 100 and panel 101. The area of connection of panel 101 and partition 102 is utilized for providing a substantially straight row of apertures 19, while substantially horizontally opposite thereto a further row of apertures 16 is provided in wall 100.

Partition 102 is further provided with apertures and mounting points for heating and steering apparatus or for cables and conduits. The receiving points 15, 16, 18, and 19 may be used individually or in groups to carry the steering mechanism, the heating unit, or the control pedal mechanism, and particularly the rows of receiving points 16 and 19 in the form of apertures may be used for securing these elements or units.

FIGURE 12 further indicates a receiving line which is formed by an elliptic bar 20 constituting the front handle bar which may be used, for example, for clamping various articles thereon such as clocks, mirrors, and the like.

The row of receiving points 19 in the form of apertures may also be utilized in combination with the receiving points 22 which form a row of eyes, as subsequently described, for suspending thereon a bed, cot, hammock, or the like.

FIGURE 13 shows a vertical cross section of a part of a door for a car as illustrated in FIGURES 1 to 4. The rounded edge of a tray 103 which may be used for depositing frequently used articles or as an arm rest is indicated in FIGURES 1 to 4 and in the list according to FIGURE 5 as a receiving line 17. This edge may also be used for clamping thereon mirrors, drinking cups, or the like, or for clamping or resting thereon a tray which may extend transversely of the car from this door to the opposite door. The door further contains a row of apertures 21 which may either be left open for the ventilation of the interior of the car or may be used for attaching, for example, a decorating strip 21a which, in turn, may be used for securing the lower ends of curtains or the like which are stretched over the inner sides of the door windows.

FIGURE 14 shows a cross section of a receiving device of a construction similar to that as illustrated in FIGURE 11 and forming a row of eyelets extending transverse to the longitudinal axis of the car. These eyelets may be associated with the receiving points 19 as previously described, or they may be used for securing baggage items or the like.

FIGURE 15 illustrates a stay bolt or pivot pin 104 which may be associated with a similar bolt at the opposite side of the car for pivotably connecting the hood of the engine or baggage compartment thereto. The outer ends of these bolts 104 constitute the receiving points 23a, 24a, and 23b, 24b and form sockets, bores or eyes. Bolts 104 may also be used for inserting therein the connecting parts of various elements such as tent bars, rearview mirrors, antennas, lights, or the like. The inner ends of the bolts may be provided with holes or hooks for attaching shades or curtains for covering the windows of the car.

FIGURES 16 to 20 illustrate some of the many possible applications of receiving points, lines or surfaces 25 to 30 in the upper parts of the car body and on the car top.

Figure 16:
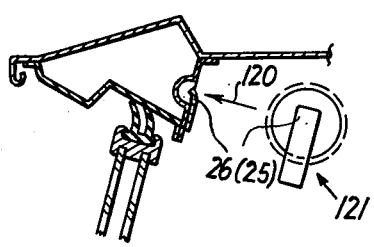

FIGURE 16 shows a cross section of a substantially flat car top with an outwardly projecting edge portion overhanging the windows. It is provided with a receiving point 26 or 25, respectively, which forms a hook facing toward the inside of the car. An enlarged view of this hook, as seen in the direction of arrow 120 in FIGURE 16, is shown at the right side of the latter and indicated by the arrow 121.

Figure 17:
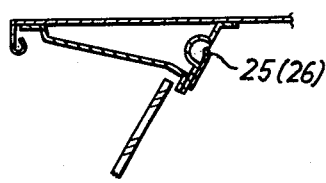

FIGURE 17 shows a cross section of a modification of the edge portion of the car top or of the shape of the edge portion at a different part of the top, for example, above the front or rear windshields. It shows a receiving point 25 or 26 in the form of a hook similar as shown in FIGURE 16.

Figure 18:
Figure 19:
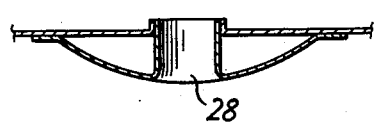

FIGURES 18 and 19 show two cross sections of a hollow crossbeam which is mounted at the lower side of the car top and provided with a plurality of receiving points for various purposes. Thus, for example, FIGURE 18 shows a narrow web which is represented by the receiving point 27 and may be used for suspending clothes hangers, bags or other articles thereon. In FIGURE 19, the central part of the crossbeam is provided with a bushing 28 into which a central mast may be inserted through the car top. This opening 28 may be utilized for various purposes in association with the receiving point 3P or 3L according to FIGURE 7. Thus, for example, by means of a mast which is mounted at these points, a camping tent or large umbrella may be erected over the car or the mast be used together with a large tent to convert the car into a kiosk or the like, as will be later described with reference to FIGURES 32 and 33. The mast may also be used, for example, as a radio antenna, as a support of a warning light or of position, direction, or running lights, as a signal mast or lamp post, or as a support of billboards or other advertisements, cameras, wind indicators, etc.

FIGURE 20 again shows a part of the projecting edge portion of the substantially flat car top which is provided with a bushing or socket 29, 30. Such sockets are preferably provided on at least two points at each side of the car top, especially for securing a baggage rack or mounting a railing thereon or for erecting a camping tent or the like on the car top.

FIGURES 21 to 35 illustrate a few of the numerous applications of the present invention, utilizing some of the receiving points for different purposes.

Figure 20:
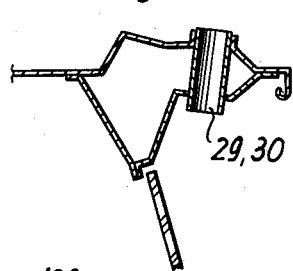
Figure 21:
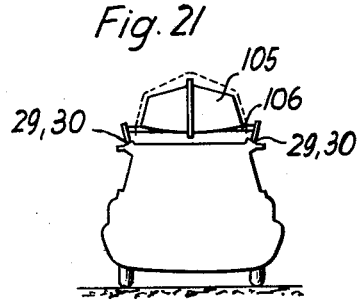
Figure 22:
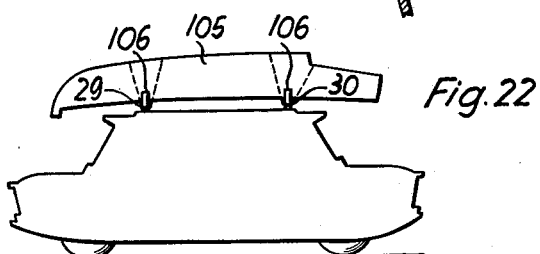

FIGURES 21 and 22 show a boat secured on top of the car on two supporting bridges 106 which, in turn, are mounted by short pipes in sockets in the projecting edge of the car top, as shown in FIGURE 20 and represented by the receiving points 29 and 30.

FIGURES 23 to 25 illustrate one of the numerous ways in which the car according to FIGURES 1 to 4 may be used for commercial or industrial purposes. In this particular example, the car is used by a stove fitter who may secure the necessary number of stove pipes on the top of the car by means of the receiving points 29 and 30, and transport, for example, a pair of stoves 109 and 110 on the inside of the car on a floorboard 107 which is reinforced at the front by a crossbeam 108 and fixed in place on the bottom of the car body at the points 7. Crossbeam 108 which is secured to floorboard 107 is, in turn, provided with a row of apertures for strapping the goods to be transported, for example, the stoves 109 and 110, in a fixed position. The stoves may furthermore be secured directly to parts of the vehicle, for example, at the row of eyes 22. A second row of eyes 14 may be used for securing a mortar box 111.

FIGURES 26 to 28 illustrate the use of a car according to FIGURES 1 to 4 for transporting small infants and children over long distances. As shown particularly in FIGURES 26 and 27, two hammocklike beds 112 and 113 of different sizes are provided. The upper bed 112 is suspended on receiving points 25 and 26 in the form of inner hooks, while the lower and larger bed 113 is attached directly to parts of the vehicle body at the receiving points 19 and 22 in the form of apertures and eyes, respectively.

FIGURES 29 to 31 show the car according to the invention equipped for carrying a motorcycle or motor scooter 114 or several bicycles and for anchoring the same securely within the car. This may be done by straps or the like which are tied to the upper parts of the scooter or the bicycles and to the receiving points 19 in the form of apertures and the receiving points 22 in the form of eyes, while at the lower side the scooter or bicycles may rest directly on the floor of the vehicle where they may be blocked, if necessary.

FIGURES 32 and 33 illustrate the use of the car according to the invention as a foundation for erecting a large round tent with a roof 115 and side walls 116. The latter may also be omitted if the structure should merely be a sort of large umbrella. The central support of the entire tent 115, 116 is formed by a mast 117 which, as previously described with reference to FIGURES 7 and 19, is inserted into the socketlike receiving points 3P and the opening or bushing 28 in the car top.

The substantially round roof 115, with or without the side walls 116, may be additionally anchored directly to the ground and may be used for the speedy erection of a shady place, an emergency clinic, a kiosk, a dressing room, a tent, or the like.

FIGURES 34 and 35 finally show side and top views of the car according to the invention and the use of the receiving points 28 and 3L, as described with reference to FIGURES 7 and 19, for erecting a mast 118 which is passed through apertures 28 and 3L and anchored directly in the ground. This mast secures the vehicle from rolling along the ground and, as it bears directly upon the ground, the weight which it has to support will not bear upon the car. Mast 118 may be used to support a stand 119, for example, for hunting, photographing, or military purposes, for harvesting fruit from fruit trees or for treating the trees, for installing and repairing overhead electric lines, cleaning windows, erecting billboards, repairing building structures and for many other purposes.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a passenger motor vehicle having wall portions enclosing a passenger compartment, a plurality of securing means positioned essentially permanently within said passenger compartment, said securing means including a fixed wall means extending over at least the major portion of the length of one of said wall portions of said passenger compartment, said fixed wall means being provided with a plurality of aligned, spaced apertures therein, and a wire element positioned closely behind said fixed wall means and in alignment with said apertures to be accessible through said apertures to enable devices to be secured thereto.

2. In a passenger motor vehicle having wall portions enclosing a passenger compartment, a plurality of securing means positioned essentially permanently within said passenger compartment, said securing means including a fixed member extending over at least the major portion of the length of one of said portions of said passenger compartment, another fixed member extending over at least the major portion of the length of a second wall portion, each fixed member being provided with a plurality of aligned, spaced apertures therein, and a wire element positioned closely behind each fixed member and in alignment with and accessible through the respective apertures to enable devices to be secured between the securing means of the two wall portions.

References Cited in the file of this patent

UNITED STATES PATENTS

| | | |
|---|---|---|
| 776,623 | Smith | Dec. 6, 1904 |
| 1,295,806 | Shuler et al. | Feb. 25, 1919 |
| 1,658,110 | Warren | Feb. 7, 1928 |
| 1,658,500 | Tewes | Feb. 7, 1928 |
| 1,908,078 | Tegethoff | May 9, 1933 |
| 2,232,094 | Canfield | Feb. 18, 1941 |
| 2,262,085 | Allen | Nov. 11, 1941 |
| 2,733,670 | Sheesley et al. | Feb. 7, 1956 |
| 2,753,816 | Oakley | July 10, 1956 |

FOREIGN PATENTS

| | | |
|---|---|---|
| 586,537 | Germany | Oct. 23, 1933 |
| 957,456 | Germany | Jan. 31, 1957 |